United States Patent [19]

Shibata et al.

[11] 4,391,877

[45] Jul. 5, 1983

[54] MAGNETIC RECORDING MEDIUM

[75] Inventors: Fujio Shibata, Komoro; Hiroshi Kawahara, Saku; Hitoshi Azegami, Nagano, all of Japan

[73] Assignee: TDK Electronics Co., Ltd., Tokyo, Japan

[21] Appl. No.: 359,421

[22] Filed: Mar. 18, 1982

[30] Foreign Application Priority Data

Mar. 23, 1981 [JP] Japan .................................. 56-40464

[51] Int. Cl.³ ............................................. H01F 10/02
[52] U.S. Cl. .................................. 428/457; 428/695; 428/900
[58] Field of Search ........................ 428/457, 695, 900

Primary Examiner—Bernard D. Pianalto
Attorney, Agent, or Firm—Wyatt, Gerber, Shoup, Scobey & Badie

[57] ABSTRACT

A magnetic recording medium including a substrate having a magnetic coating layer thereon, said magnetic coating layer comprising ferromagnetic particles dispersed in a binder vehicle, characterized in that the magnetic coating layer contains one or more ketones selected from the compounds expressed by the general formula

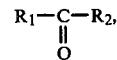

wherein $R_1$ and $R_2$ represent saturated or unsaturated chain aliphatic radicals, both or either of which have 11 to 22 carbon atoms and may contain hydroxyl, carboxyl or amino groups.

4 Claims, No Drawings

MAGNETIC RECORDING MEDIUM

BACKGROUND OF THE INVENTION

This invention relates to a high density magnetic recording medium. The magnetic recording media now in use are generally made by mixing ferromagnetic particles with a binder vehicle and coating a nonmagnetic base with the mixture. With the spread of applications for magnetic recording, there has been a growing demand for the media capable of higher density recording.

The requirements to be met in order to realize the high density recording are understood to include the following: (1) Great coercive force of the ferromagnetic particles; (2) high intensity or amount of saturation magnetization (Is) of the ferromagnetic particles; (3) fineness of the ferromagnetic particles; (4) uniform dispersion of the ferromagnetic particles in the binder vehicle; (5) smoothness of the magnetic coating film and freedom from spacing loss; and (6) low friction resistance of the magnetic coating film. Requirements (1), (2), and (3) are met by the improvement of acicular iron oxide, use of cobalt-adsorbed or cobalt-deposited acicular iron oxide, or more recently by the introduction of acicular metallic iron.

Thorough dispersion of ferromagnetic particles in a binder vehicle has been accomplished primarily through improvements in binders and dispersing agents. In order to preclude the spacing loss that is a serious obstacle to higher density recording, the magnetic coating surface must be made smoother than heretofore. However, finishing the coating film surface smooth enough to eliminate the spacing loss between itself and the magnetic head would, in turn, increase the friction between the two. The increased friction causes stick slips between the head and the coating film, producing noise commonly known as squeal.

SUMMARY OF THE INVENTION

The present invention provides high density recording media with very smooth coating film and a low coefficient of friction with the magnetic head along which the medium passes.

Conventional magnetic recording media use various lubricants, e.g., silicone oil, fatty acids, fatty acid esters, and fluorinated oil. These lubricants have been effective enough for ordinary magnetic recording media. They are not, however, sufficiently effective for media having very smooth coating films. The problem is especially acute with media having coatings which contain acicular metal particles because of the high friction coefficients.

It has now been found that aliphatic ketones are fully effective as lubricants for the latter.

DETAILED EXPLANATION OF THE INVENTION

The aliphatic ketones which are used in the present invention are represented by the general formula $$R_1-\underset{\underset{O}{\|}}{C}-R_2,$$

in which $R_1$ and $R_2$ denote chain aliphatic radicals, saturated or unsaturated, both or either of which having from 11 to 22 carbon atoms. The amount of ketone added is desirably from 0.1 to 2% on the basis of the weight of the magnetic metal powder used. This range may vary depending on the kind of binder or the surface condition of the metal powder. The abovementioned radicals may contain other functional groups to achieve similar desirable effects. Examples of such functional groups are hydroxyl, carboxyl, and amino groups.

The ketones employed in the invention are even more effective when mixed with other lubricants.

The invention is illustrated by the following non-limiting examples.

EXAMPLE 1

| | |
|---|---|
| Acicular, magnetic metal powder (average minor axis 0.04 μm) | 400 parts |
| Dispersant (lecithin) | 12 parts |
| Vinyl chloride-vinyl acetate-vinyl alcohol copolymer "VAGH" marketed by UCC) | 60 parts |
| Polyurethane resin ("Nippollan 2304" marketed by Nippon Polyurethane Ind. Co.) | 114 parts |
| Aliphatic ketone | |
| $[CH_3+CH_2\rightarrow_{16}-\underset{\underset{O}{\|}}{C}+CH_2\rightarrow_{17}-CH_3]$ | 4 parts |
| Methyl ethyl ketone | 600 parts |
| Methyl isobutyl ketone | 300 parts | were mixed with agitation and then thoroughly mixed and dispersed by a sand grinder mill. With the addition of 20 parts polyisocyanate ("Coronate" marketed by Nippon Polyurethane Ind. Co.) as a curing agent, the whole mixture was kneaded to form a magnetic coating material. The resultant material was applied to a 12 μm-thick polyester terephthalate film, and the coated film surface was finished and cured over 24 hours at 60° C. The magnetic recording medium thus obtained was sliced into ribbons 3.81 mm wide. Each roll was set in a compact cassette case as a cassette tape. Twenty cassettes were tested on a squeal tester, and none of them developed squeal. The squeal tester used was designed to pick up, in terms of electric signals, whatever squeal a test cassette tape may give while continuously running on an automatically reversible cassette deck. The results are given, in the table which appears below.

EXAMPLE 2

Magnetic tapes were made by the same procedure as described in Example 1, with the exception that the aliphatic ketone of the preceding example was replaced by another ketone of the formula $$CH_3+CH_2\rightarrow_{17}-\underset{\underset{O}{\|}}{C}+CH_2\rightarrow_{15}-CH_3.$$

The results are also tabulated below.

EXAMPLE 3

Magnetic tapes were obtained in the same way as described in Example 1 except that the aliphatic ketone was replaced by still another aliphatic ketone $$CH_3+CH_2\rightarrow_{20}-\underset{\underset{O}{\|}}{C}+CH_2\rightarrow_{21}-CH_3.$$

The results are tabulated below.

COMPARATIVE EXAMPLE 1

Magnetic tapes were made by the procedure of Example 1 except that stearic acid ($CH_3(CH_2)_{16}COOH$) was used in place of the aliphatic ketone. This example is typical of the prior art. The results are given in the following table.

COMPARATIVE EXAMPLE 2

Magnetic tapes were made in the same way as in Example 1 except that the aliphatic ketone was replaced by silicone oil,

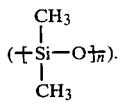

This is another example of the prior art. The results are tabulated below.

| Example | Kind of aliphatic ketone (in the general formula of the chief component) | Qty. used (PHP) | Freq. of squeal |
|---|---|---|---|
| 1 | $CH_3\text{-}(CH_2)_{16}\text{-}\underset{\text{O}}{\overset{\|\|}{C}}\text{-}(CH_2)_{17}\text{-}CH_3$ | 1 | 0/20 |
| 2 | $CH_3\text{-}(CH_2)_{12}\text{-}\underset{\text{O}}{\overset{\|\|}{C}}\text{-}(CH_2)_{13}\text{-}CH_3$ | 1 | 0/20 |
| 3 | $CH_3\text{-}(CH_2)_{20}\text{-}\underset{\text{O}}{\overset{\|\|}{C}}\text{-}(H_2)_{21}\text{-}CH_3$ | 1 | 0/20 |
| Comp. 1 | Stearic acid  [$CH_3\text{-}(CH_2)_{16}\text{-}\underset{\text{O}}{\overset{\|\|}{C}}\text{-}OH$] | 1 | 2/20 |
| Comp. 2 | Silicone oil 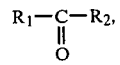 | 1 | 10/20 |

In the above table the quantity used, PHP, is the percentage of the lubricant added on the basis of the weight of the ferromagnetic powder. The frequency of squeal is the number of test tapes which squealed out of the total number of tapes sampled.

It will be appreciated from Example 1 and the table that the aliphatic ketone used had a satisfactory antisquealing effect as compared with the lubricants of Comparative Examples 1 and 2. The aliphatic ketones, which according to the invention, vary in the total number of carbon atoms, may be employed as alone or as a component of lubricant mixtures. The ketones are effective even when mixed with other lubricants, such as fatty acids, fatty acid esters, silicone oil, and the like.

While acicular magnetic alloy particles composed chiefly of iron are illustrated in the foregoing examples of the invention, it should be clear to those skilled in the art that other ferromagnetic particles, e.g., acicular gamma ferric oxide, acicular magnetite, or cobalt-doped acicular gamma ferric oxide, may be employed without departure from the essence of this invention.

What we claim are:

1. A magnetic recording medium including a substrate having a magnetic coating layer thereon, said magnetic coating layer comprising ferromagnetic particles dispersed in a binder vehicle, characterized in that the magnetic coating layer contains one or more ketones selected from the compounds expressed by the general formula $$R_1-\underset{O}{\overset{\|\|}{C}}-R_2,$$

wherein $R_1$ and $R_2$ represent saturated or unsaturated chain aliphatic radicals, both or either of which have 11 to 22 carbon atoms and may contain hydroxyl, carboxyl or amino groups.

2. A magnetic recording medium according to claim 1, wherein said ketone is present in an amount from 0.1 to 2% based on the weight of the ferromagnetic particles.

3. A magnetic recording medium according to claim 1 or 2, wherein said ketone is selected from the group of

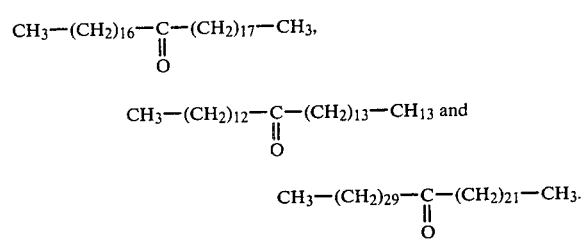

4. A magnetic recording medium according to claim 1, 2 or 3, wherein said ferromagnetic particles are acicular particles of an alloy composed chiefly of iron.

* * * * *